(12) United States Patent
Kuze (10) Patent No.: US 6,213,060 B1
(45) Date of Patent: *Apr. 10, 2001

(54) COOLING SYSTEM FOR AN AUTOMOTIVE ENGINE

(76) Inventor: Yoshikazu Kuze, 31-3, Higashi-Magome 1-Chome, Ota-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/195,788

(22) Filed: Nov. 18, 1998

(30) Foreign Application Priority Data

Sep. 7, 1998 (JP) .................................................. 10-289927

(51) Int. Cl.⁷ ...................................................... F01P 7/14
(52) U.S. Cl. ...................................... 123/41.1; 123/41.12
(58) Field of Search .............................. 123/41.1, 41.12, 123/41.49; 236/34

(56) References Cited

U.S. PATENT DOCUMENTS

| | | | |
|---|---|---|---|
| 4,313,402 | * | 2/1982 | Lehnhoff et al. ................... 123/41.12 |
| 4,679,530 | * | 7/1987 | Kuze .................... 123/41.1 |
| 4,955,431 | * | 9/1990 | Saur et al. ............................ 165/271 |
| 5,526,871 | * | 6/1996 | Musser et al. ....................... 165/11.1 |
| 5,697,552 | * | 12/1997 | McHugh et al. .................... 236/78 B |

* cited by examiner

Primary Examiner—Marguerite McMahon
Assistant Examiner—Jason Benton
(74) Attorney, Agent, or Firm—Koda & Androlia (57) ABSTRACT

A cooling system has a radiator for cooling coolant of an automotive engine, cooling fan for cooling the coolant in the radiator, and a thermostat for controlling coolant temperature. The thermostat has a housing having a flange, an actuating rod secured to the housing at a first end thereof, a guide member slidably mounted on the actuating rod, a resilient seal spool provided around a second end portion of the actuating rod and secured to the guide member, a heat sensitive cylinder housing the seal spool and secured to the guide member, wax pellets provided in the heat sensitive cylinder to enclose the seal spool. The flange having at least one hole so as to pass the coolant, resulting the spring constant of return spring reduced in half and thickness of the resilient seal spool set between 25% and 5% of the diameter of the actuating rod; and further a cooling fan switch linked to the thermostat through the electronic control system, thereby turn an upper limit of the coolant to an extremely low temperature.

4 Claims, 12 Drawing Sheets

COOLING SYSTEM FOR AN AUTOMOTIVE ENGINE

BACKGROUND OF THE INVENTION

1. Field of the Invention

The present invention relates to an electronic control cooling system for controlling temperature of a coolant of an automotive engine for prevention of the global warming.

2. Description of the Related Art

Figure 6:
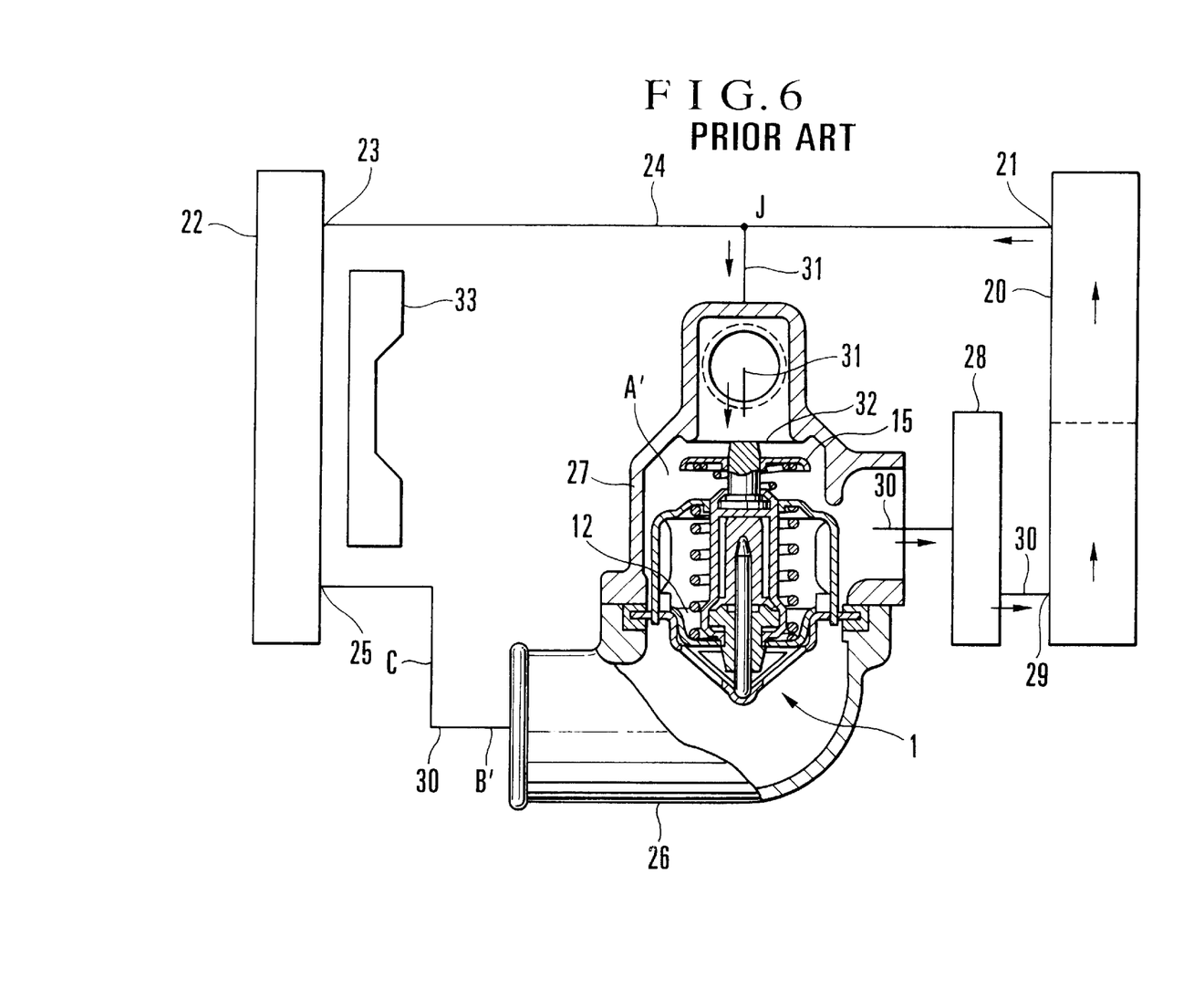
FIG. 6 is a schematic diagram of a conventional cooling system for an automotive engine.

Referring to FIG. 6 showing a conventional cooling system for an automotive engine, the system has a thermostat 1 which is disposed in an inlet side passage of water jackets 20.

The cooling system comprises a first coolant passage 24 disposed between an upper outlet 21 of the water jackets 20 and an upper inlet 23 of a radiator 22, and a second coolant passage 30 provided between a lower outlet 25 of the radiator 22 and a lower inlet 29 of the water jackets 20, including a thermostat cap 26, a thermostat housing 27 and a water pump 28. A bypass passage 31 is provided between a junction J of the first passage 24 and the thermostat housing 27 so as to communicate the first passage 24 with the second passage 30 without passing the radiator 22. The thermostat 1 is hermetically secured to the housing 27 by the thermostat cap 26. The thermostat 1 has a main valve 12 for closing the second passage 30 and a bypass valve 15 for closing a bypass port 32 of the bypass passage 31.

In FIG. 6, the reference A' designates a measuring point for measuring the temperature of the coolant in the housing 27, and the reference B' designates a measuring point provided in the second passage 30 adjacent to the thermostat cap 26. The reference C designates a measuring point for measuring the flow rate of the coolant in the second passage 30. The reference numeral 33 designates a cooling fan.

The thermostat 1 is operated by a thermo-actuator. The thermo-actuator comprises an actuating steel rod and a resilient seal spool which is slidably engaged with the rod. The seal spool is inserted in a heat sensitive cylinder filled with wax pellets.

Figure 7:
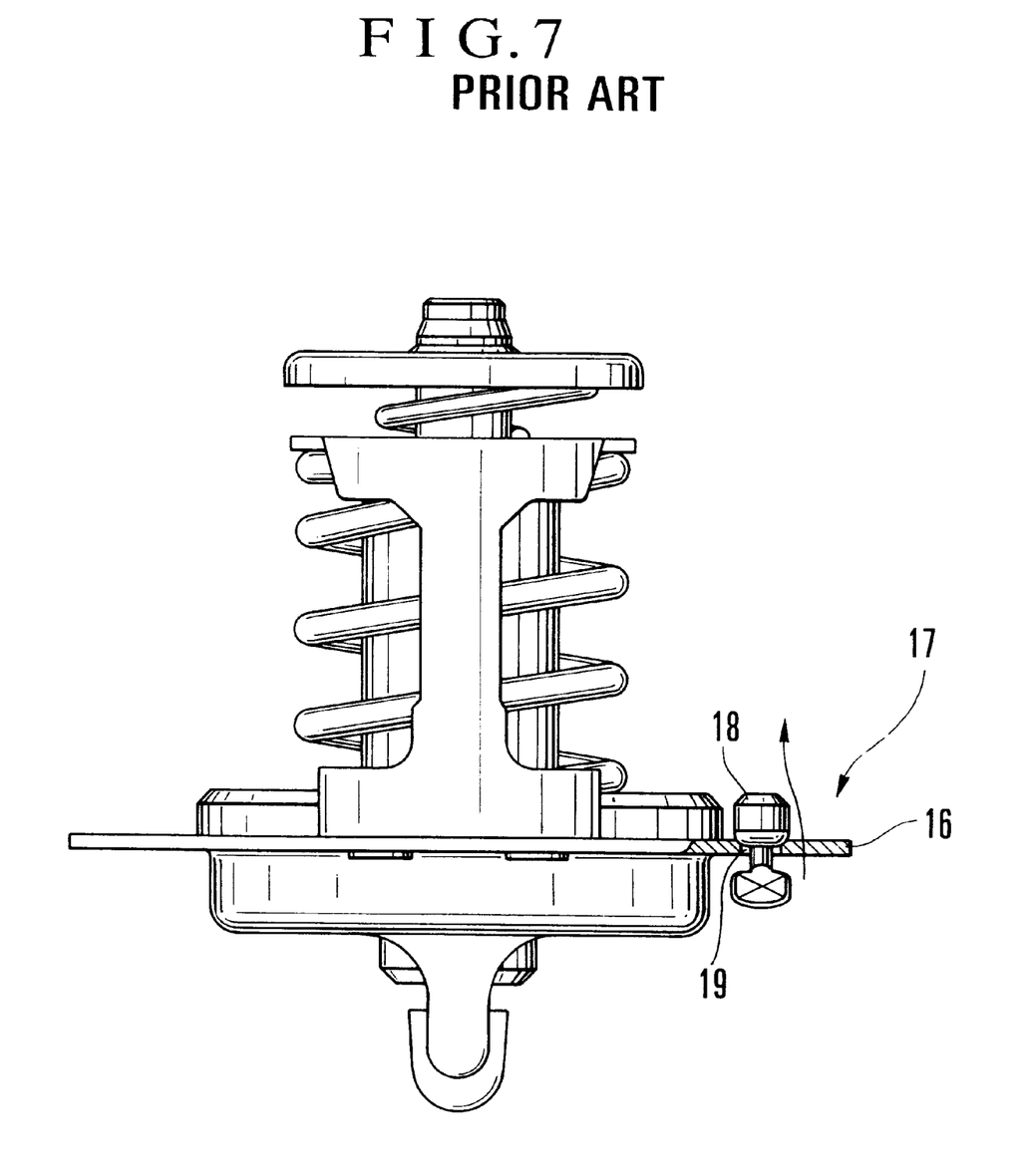
FIG. 7 is a jiggle valve mechanism of a conventional thermostat.

As shown in FIG. 7, a perforation 19 is formed in a flange 16 of the thermostat 1, and a jiggle valve mechanism 17 having a jiggle valve 18 is movably engaged in the perforation 19.

During the operation of the engine, the jiggle valve 18 is closed by the pressure of the coolant in the second coolant passage 30 as shown in FIG. 7. When the engine stops, the jiggle valve opens. Thus, the coolant can be supplemented in the direction of the arrow.

During the cold engine state, the main valve 12 of the thermostat 1 is closed as shown in FIG. 6, and the jiggle valve 18 is also closed by the coolant pressure, while the bypass valve 15 integrated with the main valve 12 is fully opened. Thus, the coolant drawn from the outlet 21 of the water jackets 20 does not pass through the radiator 22. The coolant is circulated by the water pump 28 through the junction J of the first passage 24, bypass passage 31, housing 27, and inlet 29 of the water jackets 20 as indicated by arrows. Thus, the temperature of the coolant in the housing 27 quickly rises.

However, since the coolant in the radiator 22 and the thermostat cap 26 is not circulated, the temperature rising rate of the coolant temperature B therein is slow. Therefore, as shown in a record of FIG. 8, after even if the temperature A at the point A' becomes 87° C. which is an opening temperature of the main valve 12, the temperature B at the point B' is merely 45° C. There is a difference of 42° C. between the temperatures A and B.

Figure 8:
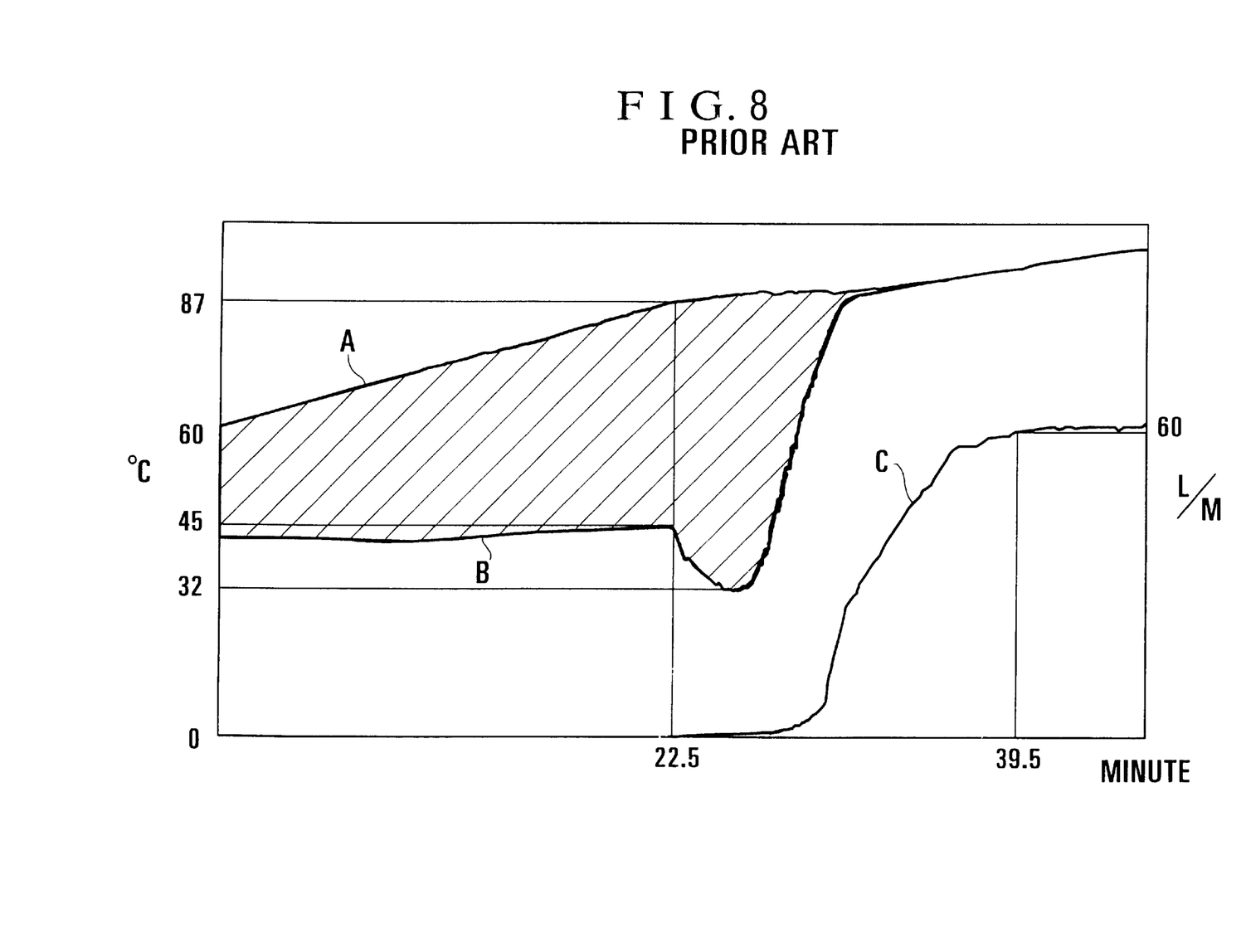
FIG. 8 is a graph showing changes of temperature and flow rate of the coolant of the conventional system with respect to time.

When the main valve 12 of the thermostat 1 opens, the coolant of a low temperature is drawn from the lower outlet 25 of the radiator 22 and fed to the thermostat housing 27 through the second passage 30. Consequently, the temperature B of the coolant at the point B' is further lowered by 13° C. As a result, the difference between the temperature B of the coolant in the passage 30 and the temperature A of the coolant in the housing 27 increases to 55° C. The area of the part shown by the hatching indicates energy loss in the period. It will be understood that the time of the abscissa indicates the elapse from the time at 60° C. of the temperature A.

Since the heat sensitivity of the thermostat 1 is low, the response of the thermostat delays with respect to the change of the coolant temperature. Therefore, the main valve 12 opens after the temperature has become considerably higher than the predetermined opening temperature 87° C. The main valve 12 closes after the coolant temperature has considerably decreased lower than a predetermined closing temperature. So that the main valve 12 is repeatedly opened and closed. When the main valve 12 closes, a surge pressure occurs at the upstream of the main valve 12.

The heat overshoot causes cracks of the cylinder block and cylinder head of the engine, and the surge pressure causes breakdown of the thermostat 1 and the radiator 22.

Figure 4:
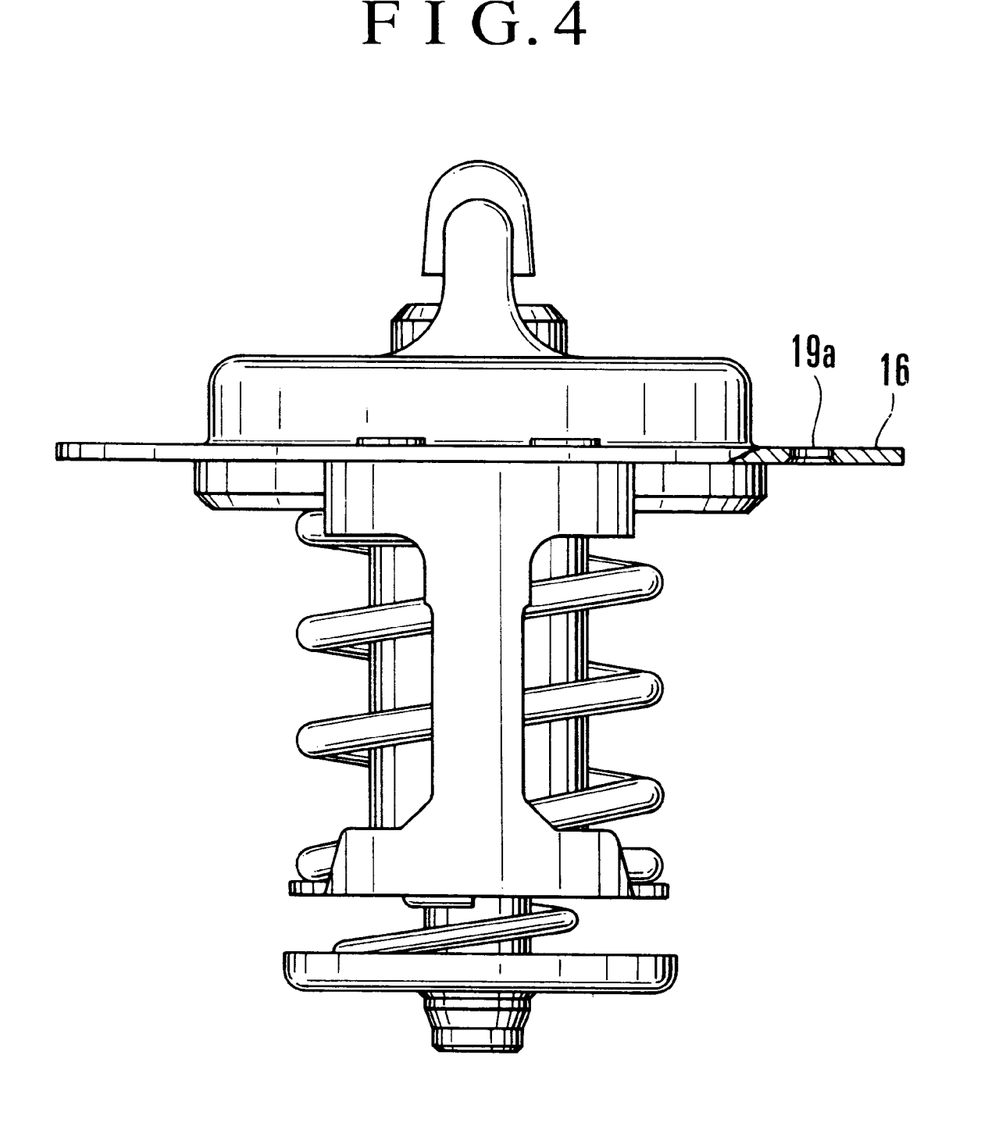
FIG. 4 is a side view of the thermostat of the present invention.

Since, mentioned in above, the jiggle valve mechanism is sources of energy loss and engine troubles, the jiggle valve mechanism is removed from the present thermostat. Further, a small hole 19a is formed in the flange 16 of the thermostat (FIG. 4). The pressures applied to the outer side and inner side of the main valve 12 become equal to each other. The spring constant of the return spring is reduced in half. Furthermore, the thickness of the seal spool is extremely thin (thickness of between 25% and 5% of the diameter of the actuating rod), the pressure of the wax for the lift up of the valve is reduced.

Figure 1:
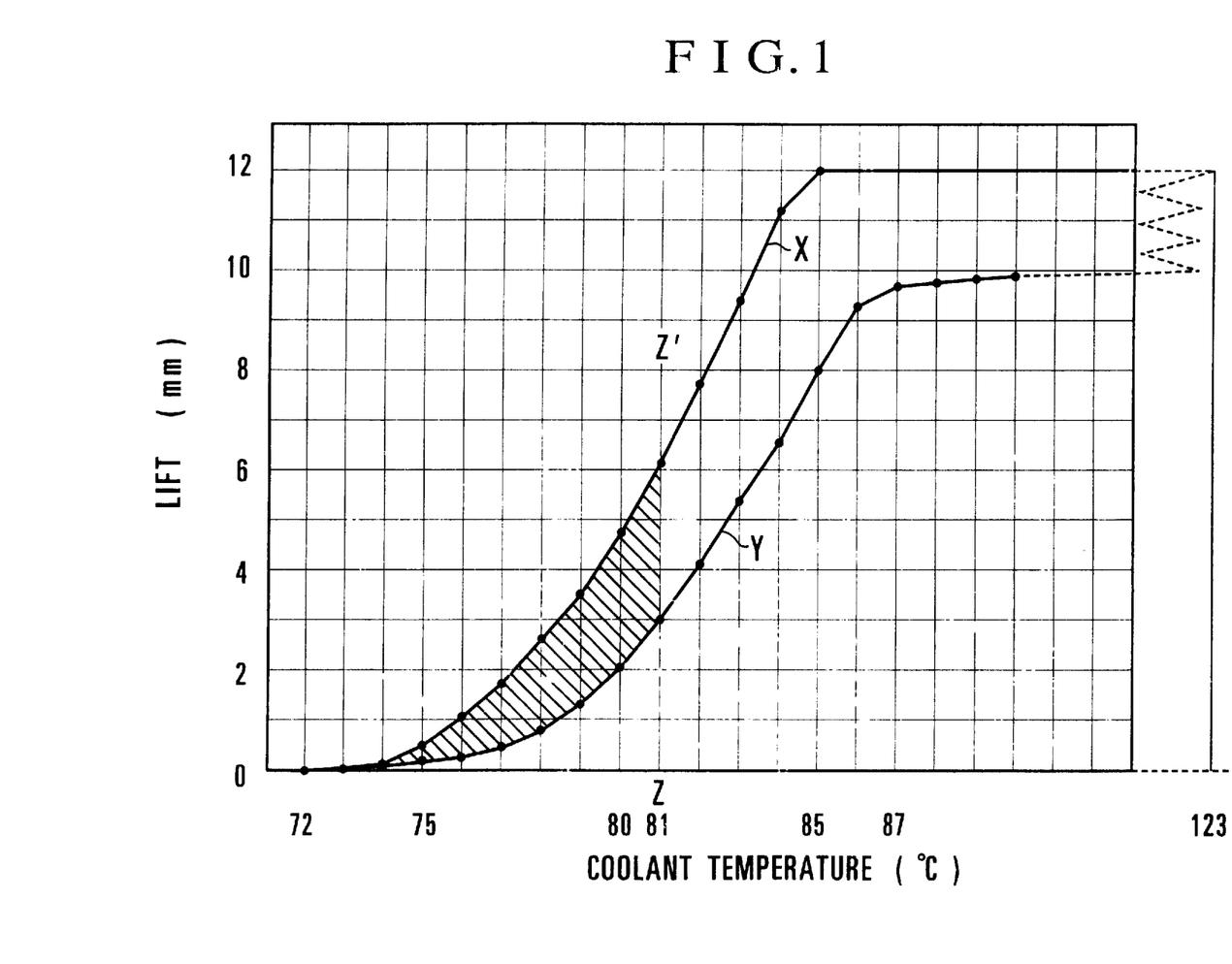
FIG. 1 is a graph showing changes of a lift of a valve in a thermostat of the present invention and a lift of a conventional valve with respect to temperature.

FIG. 1 is a diagram showing the lift with respect to the coolant temperature. A line X is the lift of the valve of the present invention and the line Y is the lift of the conventional valve. The range of the steep curve line is the solid wax state.

The main valve of the conventional valve Y opens at 72° C., the lift at the end temperature 87° C. of the solid wax state is merely 9.6 mm. Thereafter, the lift up rate reduces because of the liquid wax state, and when the lift becomes 12 mm, the coolant temperature reaches such a high temperature as 123° C.

The main valve 12 of the present invention also opens at 72° C., when the lift reaches 12 mm, the coolant temperature is 85° C. as shown by the line X, which is within the range of the solid wax state.

The line Z—Z' of FIG. 1 shows the upper limit of 81° C. The hatched area shows the difference between the flow rate of the present invention and the flow rate in the conventional valve. The lift of the line X at 81° C. is 6 mm and the lift of the line Y is 3 mm. Therefore, the flow rate of X is two times as much as the flow rate of Y.

The coolant flowing through a small hole 19a (FIG. 4) on the flange 16 needs not worry about taking a longer warm up period for a idling. Because the cold start fuel injector is provided in the throttle body controlled by a computer.

In the cooling system, the fan switch of the present invention is linked to the thermostat, when the coolant temperature reaches 81° C., the cooling fan operates. Since the flow rate of the coolant at 81° C. is the double of that of the conventional thermostat, the coolant temperature quickly decrease. Therefore, the coolant temperature is kept 81° C.

However, the upper limit for the cooling fan is not limited to 81° C. It is desirable to set the temperature to an effective value as low as possible dependent on tests.

SUMMARY OF THE INVENTION

An object of the present invention is to provide a cooling system having a wax type thermostat a main valve of which has double flow rate of the conventional thermostat.

In addition, a cooling fan switch linked to the thermostat through an electronic control system, resulting the prevention of global warming.

These and other objects and features of the present invention will become more apparent from the following detailed description with reference to the accompanying drawings.

DETAILED DESCRIPTION OF THE PREFERRED EMBODIMENTS

Figure 2:
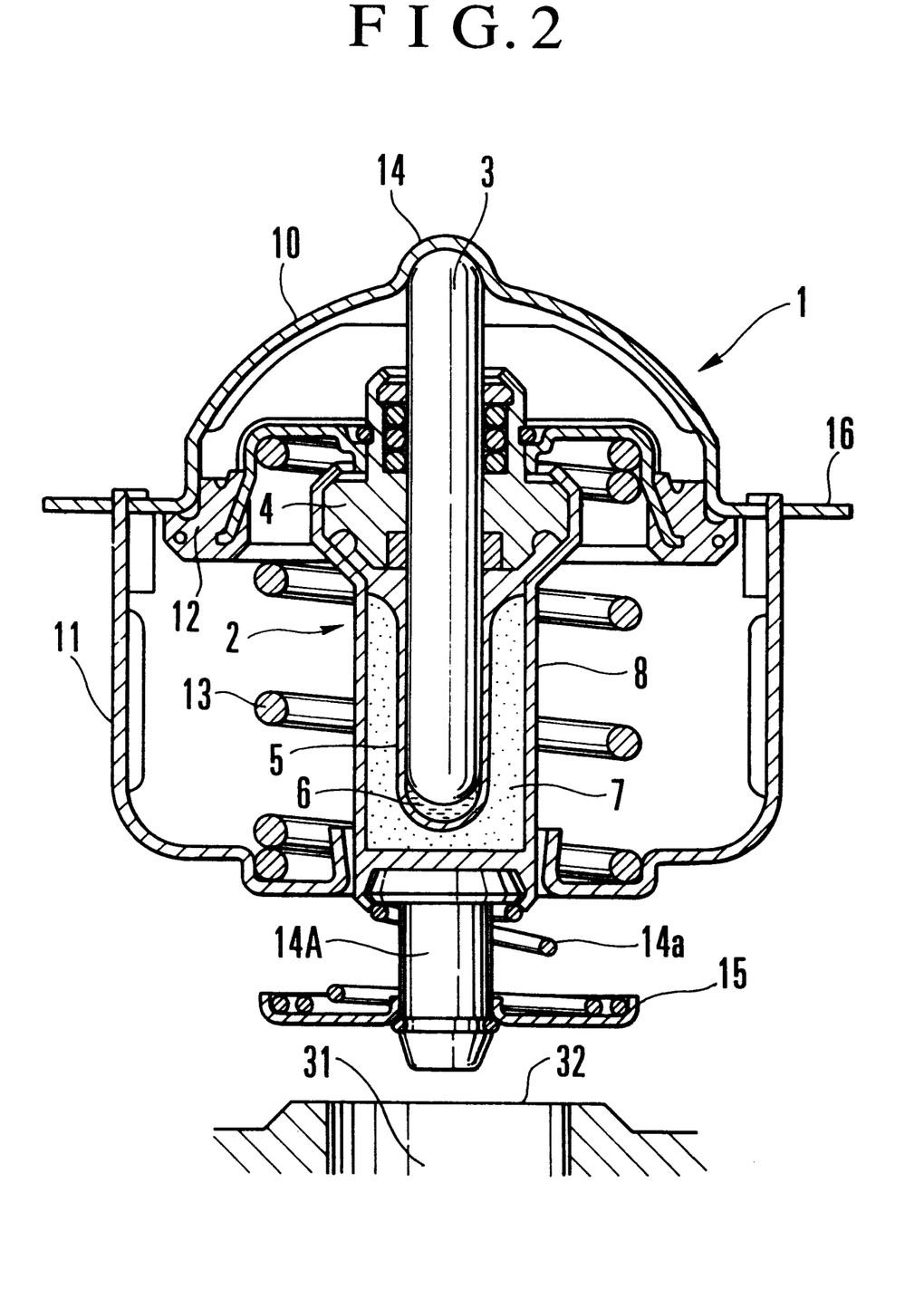
FIGS. 2 and 3 are sectional side views of the thermostat of the present invention.
Figure 3:
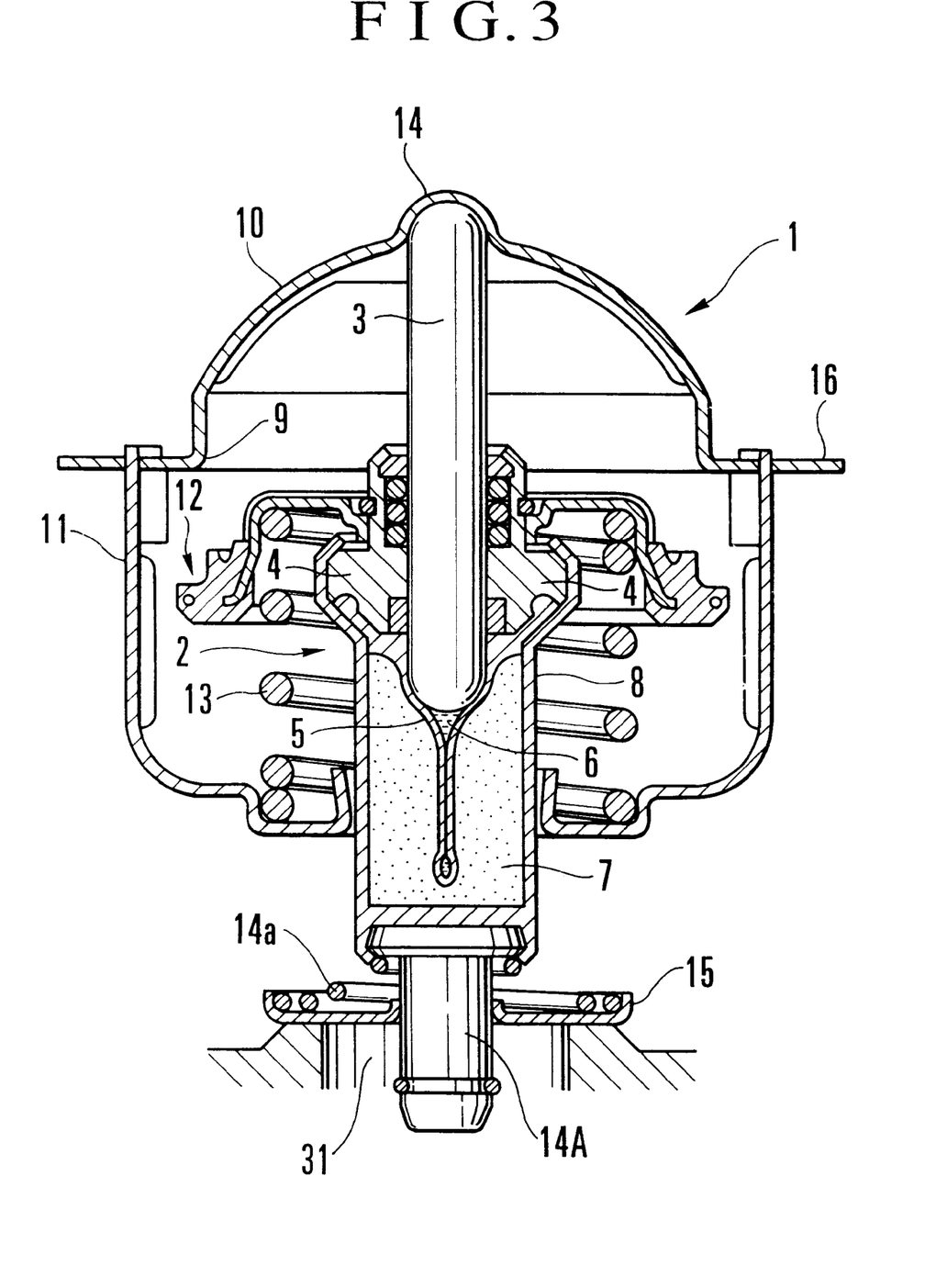

FIG. 2 shows a main valve 12 closing state, and FIG. 3 shows a main valve 12 opening state. A thermostat 1 of the present invention has a housing 10 forming a valve seat 9 (FIG. 3), a frame 11 secured to a flange 16 of the housing 10.

A thermo-actuator 2 comprises a actuating steel rod 3, a guide member 4 slidably mounted on the rod 3, and a resilient seal spool 5 which is hermetically secured to the guide member 4 and slidably engaged with the rod 3. The thickness of a bag portion of the seal spool 5 is between 25% and 5% of the diameter of the rod 3. A lubricating oil 6 fills the space between the seal spool 5 and the rod 3. The seal spool 5 is inserted in a heat sensitive cylinder 8 filled with wax pellets 7. An end of the cylinder 8 is securely engaged with the guide member 4, thereby forming the thermo-actuator 2.

The rod 3 of the thermo-actuator is secured to the housing 10 at a top portion 14, and the main valve 12 is secured to the guide member 4. A return coil spring 13 disposed surrounding the cylinder 8 is provided between the main valve 12 and the bottom of the frame 11. A bypass valve 15 is slidably mounted on a shaft 14A secured to the cylinder 8 and resiliently held on the shaft 14A by a spiral spring 14a. The flange 16 has a small hole 19a (FIG. 4) for communicating the space (A' of FIG. 12) in the thermostat housing with the passage (B' of FIG. 12) in the thermostat cap 26. As a result, the spring constant of the return spring 13 can be reduced to a half of that of the conventional spring.

FIG. 2 shows the main valve 12 in the close state. When the temperature of the coolant rises in excess of a predetermined value of the thermostat 1, the wax 7 in the heat conductive cylinder 8 expands. This forces the seal spool 5 against the rod 3. Since the rod 3 is secured to the housing 10 the cylinder 8 is downwardly moved against the force of the spring 13, thereby opening the main valve 12, and closing the bypass port 32 with the bypass valve 15 (FIG. 3). When the coolant temperature decreases, the wax contracts. Thus, the coil spring 13 causes the main valve 12 to move to the closed position.

Figure 5:
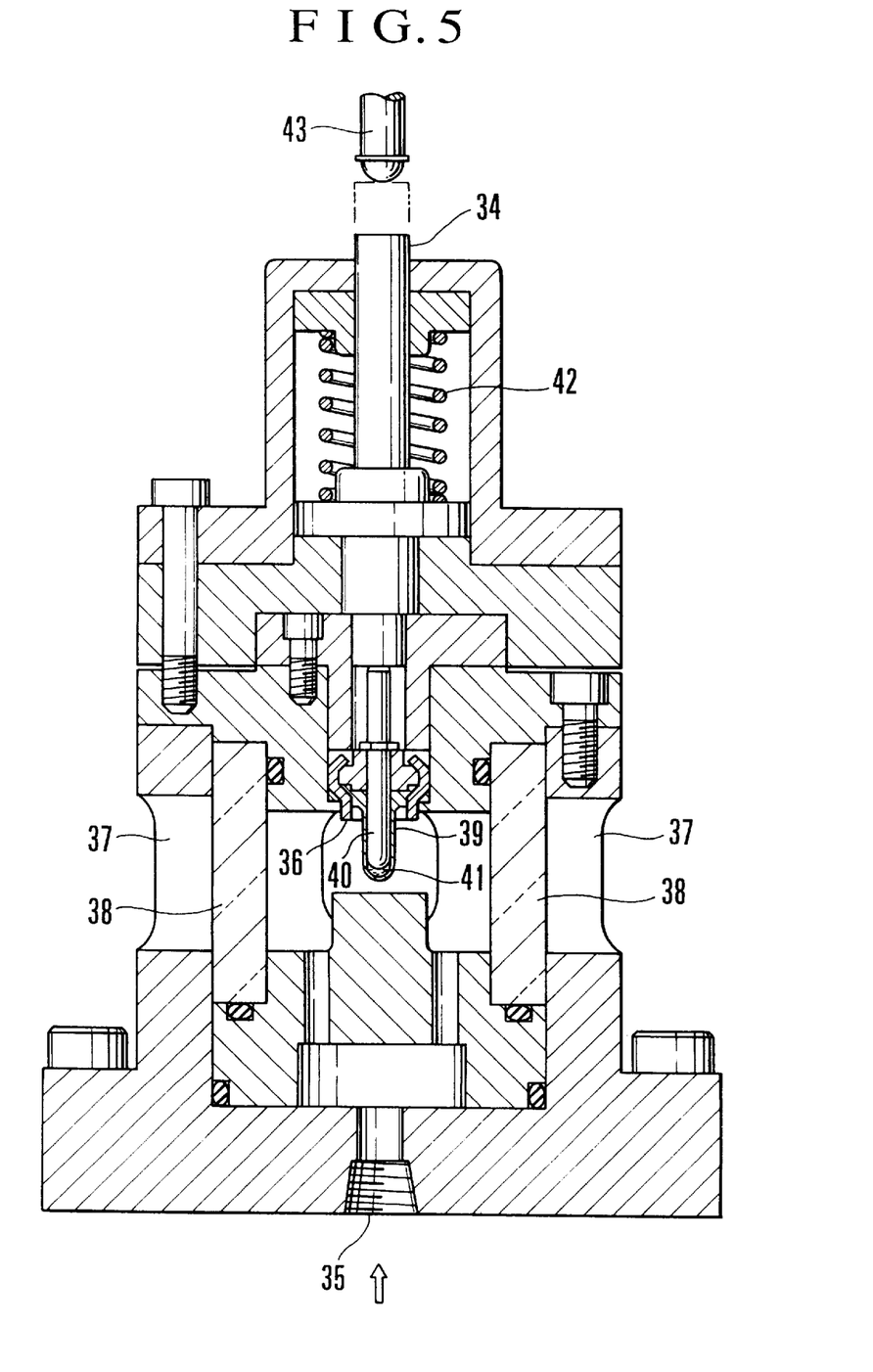
FIG. 5 shows a sectional view showing a test machine for a valve lift.

FIG. 5 shows a test machine for measuring the lift of the main valve 12 with respect to the pressure applied to the seal spool. In the machine, oil pressure is used instead of wax pressure.

A thermo-actuator 36 is a ttached in the test machine, cutting the heat sensitive cylinder so as to observe a resilient seal spool 39. The space between the seal spool 39 and a rod 40, is fitted with a lubricating oil 41. The seal spool 39 can be observed through opening 37 and a transparent plastic pipe 38. The test machine has a slidable rod 34 downwardly urged by a spring 42. The top of the rod 34 contacts with a rod 43 of a dial indicator (not shown). The oil is supplied from an inlet 35

Table 1 shows actually measured values for the relation between oil pressure and the lift of the main valve 12 by the test machine of FIG. 5.

TABLE 1

| | PRESSURE-LIFT | | |
|---|---|---|---|
| $Kg/cm^2$ | THERMO-ACTUATOR (A) LIFT mm | THERMO-ACTUATOR (B) LIFT mm | THERMO-ACTUATOR (C) LIFT mm |
| 0 | 0 | 0 | 0 |
| 10 | 0 | 0 | 0 |
| 20 | 0 | 0 | 0 |
| 30 | 0 | 0 | 0 |
| 40 | 0 | 0 | 0 |
| 50 | 0 | 0.4 | 0.4 |
| 60 | 0 | 1.5 | 2.6 |
| 70 | 0 | 2.8 | 5.0 |
| 80 | 0.6 | 6.2 | 7.8 |
| 90 | 1.6 | 9.5 | 10.0 |
| 100 | 2.5 | 10.0 | |
| 110 | 5.5 | | |
| 120 | 8.0 | | |
| 130 | 9.5 | | |
| 140 | 10.0 | | |

SPRING CONSTANT OF RETURN SPRING: 0.55 Kg/mm

In the Table 1, a thermo-actuator (A) has a rod 3 of 3.8 mm diameter and seal spool of 1.7 mm thickness (45% of the diameter), a thermo-actuator (B) has the rod of 4.5 mm diameter and the seal spool of 1.25 mm (25%), and a thermo-actuator (C) has the rod of 4.5 mm diameter, and the seal spool of 0.225 mm (5%). The spring constant of the return spring 13 is 0.55 Kg/mm. Since the thermo-actuator (A) has a large thickness of 1.7 mm, the lift is 0.6 mm at the starting pressure of 80 Kg/cm$^2$.

Although the starting pressure for the rod 3 is 50 Kg/cm$^2$ for both the thermo-actuators (B) and (C) and the lift is the same 0.4 mm, the rod of (C) is lifted up 10 mm by the pressure of 90 Kg/cm$^2$ because of extremely small thickness 0.225 mm. But for (B), the large pressure of 100 Kg/cm$^2$ is necessary.

Table 2 shows actually measured values.

TABLE 2

PRESSURE-LIFT

| Kg/cm$^2$ | THERMO-ACTUATOR (D) LIFT mm |
|---|---|
| 0 | |
| 10 | |
| 20 | |
| 30 | 0.3 |
| 40 | 4.0 |
| 50 | 9.5 |
| 60 | 13.5 |
| SPRING CONSTANT OF RETURN SPRING: 0.27 Kg/mm | |

A thermo-actuator (D) has the same rod diameter and seal spool thickness as the thermo-actuator (C), but the spring constant is reduced from the conventional value of 0.55 Kg/mm to 0.27 Kg/mm. The rod is lifted up 0.3 mm at the starting pressure 30 Kg/cm$^2$, and 13.5 mm at the pressure 60 Kg/cm$^2$.

Figures 9A, 9B:
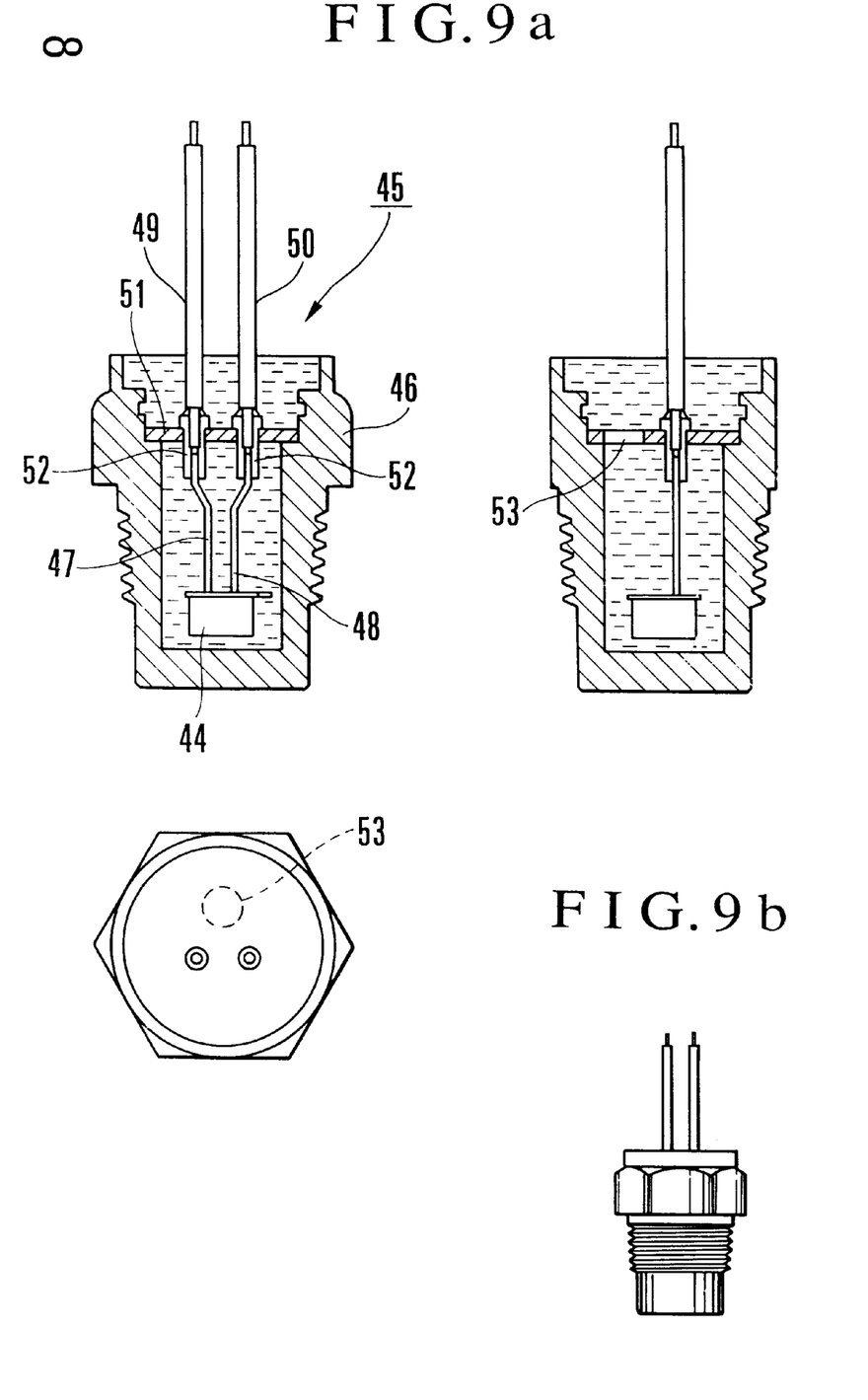
FIG. 9a is a sectional view of a cooling fan switch.
FIG. 9b shows a side view showing the cooling fan switch of FIG. 9a at full-size.

FIG. 9a is a sectional view of a cooling fan switch 45 with a semiconductor thermo sensor 44, and FIG. 9b is a side view of the switch 45 at full-scale. The cooling fan switch 45 comprises a body 46, and plus terminal 47 secured to the seal cord 49 through a sleeve 52 which fixed with a insulated plate 51. A minus terminal 48 of the sensor 44 is connected to the minus seal cord 50 similarly as the plus seal cord 49. Insulation resin such as epoxy resin is poured into the inside of the switch 45 from an opening 53 to solidify the inside parts. The cooling fan switch is also closed at 75.5° C. for example.

Figure 10:
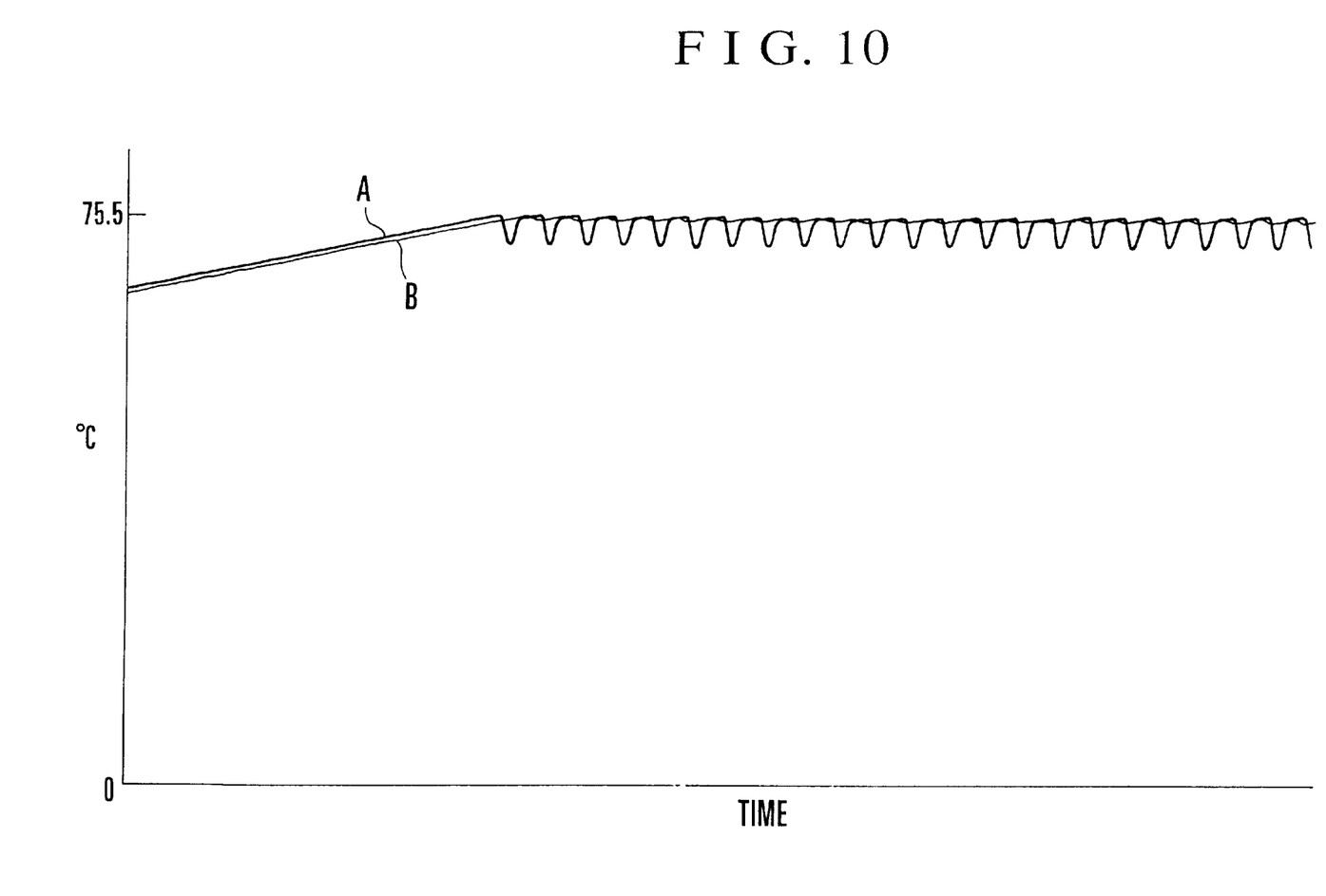
FIG. 10 is a graph showing the change of the coolant temperature with respect to the elapsed time.

FIG. 10 is a diagram showing the change of the coolant temperature with respect to the elapsed time. When the coolant temperature A (at A' of FIG. 12) reaches 75.5° C., the cooling fan switch is closed so that the cooling fan is started. Therefore, the coolant temperature reduces and rises, and hence, the temperature cyclically changes at a constant amplitude between 75.5° C. at a lower temperature as shown in the diagram. The temperature does not exceed 75.5° C. The temperature B is held at about 75.5° C.

At the time when the cooling fan switch 45 is closed, the cooling fan continues to rotate by the inertia thereof. Therefore, the torque for starting the motor is very small, which results in reduction of vibration and noises.

Figure 11:
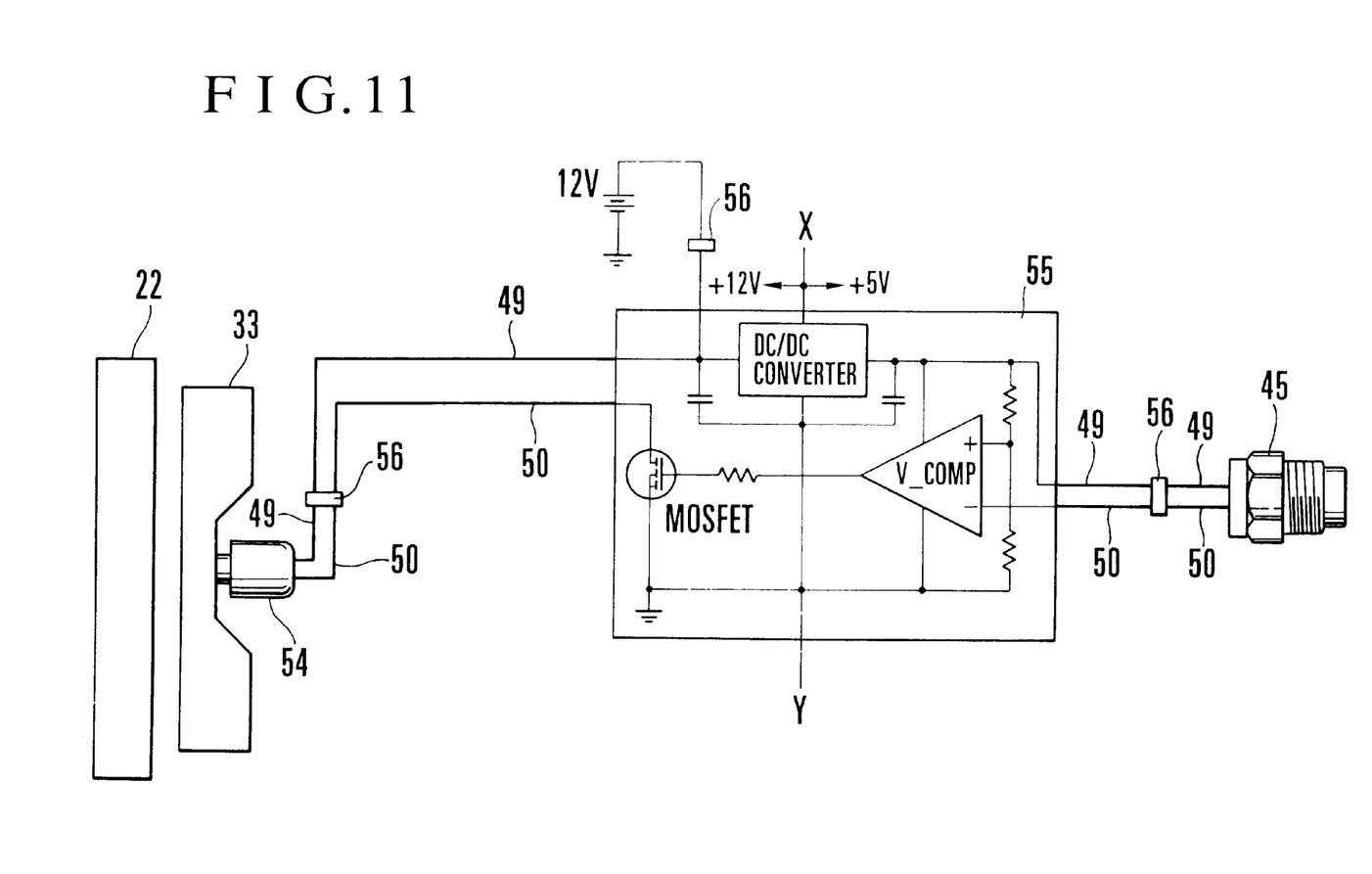
FIG. 11 is a circuit showing an electronic control system.

FIG. 11 shows an electronic control system wherein the cooling fan switch 45, a cooling fan motor 54, and a power source 12V are connected to an electronic control unit 55 as a center by seal cords 49, 50 and a connector 56, and further the cooling fan 33 and radiator 22 are included.

The electronic control unit 55 is composed by a cubic (44 mm×34 mm×20 mm) aluminum case mounting the circuit board of the electronic circuit parts.

According to the DC/DC converter the X-Y center line divided into the 5V system control circuit at the right side and the 12V system control circuit at the left side.

The first step voltage comparator is provided for amplifying and switching the signal for the cooling fan switch 45, and subsequent circuits are signal converting circuits for stabilizing 5V.

The power MOS-FET driver at the final stage is provided to ON/OFF the cooling fan motor. The driver is a stable 5V system control circuit, the switching operation is accordingly stabilized.

In the general fan motor circuit, the voltage reduced from 12V to 7.5V at the starting, causing malfunction of the motor. However, the electronic control unit 55 keeps the 12V constant, thereby controlling the ON/OFF operation calmly in permanent.

Accordingly, it is not allowed that the radiator 22 and the cooling fan 32 are used also for cooling the condenser for condensing in the air conditioner as is used in the conventional cooling system. The radiator and the cooling fan for the air conditioner prepared another place.

Figure 12:
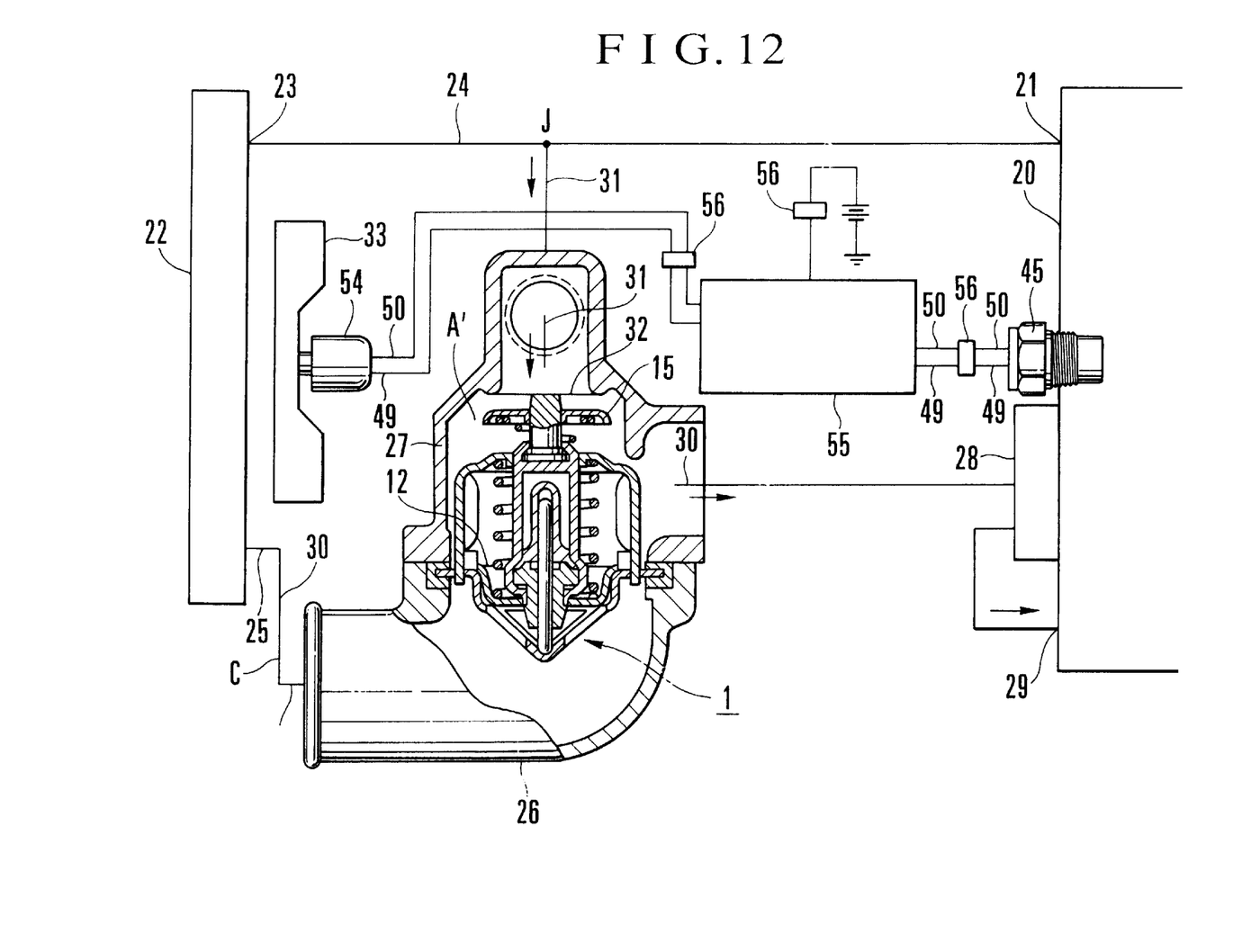
FIG. 12 is a schematic diagram showing a cooling system according to the present invention.

FIG. 12 shows an example of the cooling system of the motor vehicle according to the present invention. The same parts as the engine cooling system shown in FIG. 6 are identified by the same numerals. Although in the convenience of explanation, the housing 27 and the water pump 28 are separated. Actually, the housing 27 and the water pump 28 are directly attached on the water jacket 20. Therefore, the cooling fan switch 45 is attached to a proper position (there are many choices) wherein the cooling water of the water jacket flows. In the thermostat, the seal spool has a small thickness, a small hole is formed instead of jiggle valve, the spring constant of the return spring reduced in half; and further a cooling fan switch linked to the thermostat through the electronic control system, the upper limit of the coolant of the present invention is reduced to 81° C. or lower from 123° C. of the conventional thermostat. So that the life of the engine is extended, the fuel consumption, the emission of NOx, and CO$_2$ are similarly large reduced, thereby contributing to the prevention of the global warming.

While the invention has been described in conjunction with preferred specific embodiment thereof, it will be understand that this description is intended to illustrate and not limit the scope of the invention, which is defined by the following claims.

What is claimed is:

1. A cooling system for an automotive engine comprising:

a radiator for cooling a coolant of the automotive engine;

a cooling fan driven by a motor for cooling the coolant in the radiator;

a first coolant passage provided between an outlet of a water jacket of the engine and an inlet of the radiator;

a second coolant passage provided between an outlet of the radiator and an inlet of the water jacket;

a bypass passage communicating the first coolant passage and the second coolant passage with each other;

a housing provided at an intersection of the second coolant passage and the bypass passage;

a rod secured to the housing;

a guide member slidably mounted on the rod;

a resilient seal spool enclosing the rod and hermetically engaged with the guide member at a base portion thereof;

a lubricant oil sealed in a space between the rod and the seal spool a heat sensitive cylinder enclosing the guide member and the seal spool;

wax pellets sealed in the heat sensitive cylinder;

a main valve secured to the guide member so as to close the second coolant passage;

a bypass valve secured to the heat sensitive cylinder so as to close the bypass passage;

a flange having a valve seat and secured to the housing; and a return spring urging the main valve to the valve seat; and wherein coolant pressure is applied to inside and outside surfaces of the flange when the main valve closes the second coolant passage;

a thickness of the seal spool at a portion engaging with the rod is 25% to 5% of the diameter of the rod;

at least one hole is formed in the flange;

a cooling fan switch is provided for detecting the temperature of the coolant and is provided so as to be closed at a predetermined temperature to produce an output signal;

an electronic control unit responsive to the output signal of the cooling fan switch for driving the motor to operate the cooling fan is provided;

the thickness of the seal spool and the spring constant of the return spring are selected so that the operation of the main valve is within a temperature range in which the wax pellets change from a solid state to a liquid state; and the predetermined temperature for closing the cooling fan switch is set to a value so that an upper limit of the coolant temperature is limited within a range in which the wax pellets change from a solid state to a liquid state.

2. An electronic control cooling system according to claim 1, wherein the cooling fan switch is built-in a semiconductor thermo sensor and is exposed to plus and minus sealed cords, respectively.

3. An electronic control cooling system according to claim 1, wherein the electronic control system includes the cooling fan switch, a cooling fan motor, an electronic control unit and a power source, and further the cooling fan and the radiator are connected to the electronic control unit as a center.

4. An electronic control cooling system according to claim 1, wherein the cooling fan switch is contactless.

* * * * *